Dec. 26, 1961 H. J. McCREARY 3,014,988

MAGNETIC SATURATION CONTROL DEVICES

Filed Aug. 18, 1958 4 Sheets-Sheet 1

INVENTOR.
HAROLD J MC CREARY

BY C. A. Gulbrandsen

ATTY.

INVENTOR.
HAROLD J. McCREARY
BY
C. A. Gulbrandsen
ATTY.

Dec. 26, 1961 H. J. McCREARY 3,014,988

MAGNETIC SATURATION CONTROL DEVICES

Filed Aug. 18, 1958 4 Sheets-Sheet 3

INVENTOR.
HAROLD J. McCREARY
BY
C. A. Gulbrandsen
ATTY.

Dec. 26, 1961 H. J. McCREARY 3,014,988

MAGNETIC SATURATION CONTROL DEVICES

Filed Aug. 18, 1958 4 Sheets-Sheet 4

INVENTOR.
HAROLD J. MC CREARY

BY C. A. Gulbrandsen

ATTY.

United States Patent Office 3,014,988
Patented Dec. 26, 1961

3,014,988

MAGNETIC SATURATION CONTROL DEVICES

Harold J. McCreary, Lombard, Ill., assignor to Automatic Electric Laboratories, Inc., a corporation of Delaware Filed Aug. 18, 1958, Ser. No. 755,452
11 Claims. (Cl. 179—16)

This invention relates in general to magnetic control devices and in particular to magnetic control devices which utilize local saturation for effecting their control function.

In magnetic circuits the quantity of magnetomotive force required to produce a flux of given magnitude is dependent upon the reluctance of the magnetic path. This reluctance is in turn dependent upon the length and cross-sectional area of the path and the permeability of the core material. Once the magnetic material has been saturated a much greater percentage increase in magnetomotive force is required to produce a given increase in flux. Since the circuit configuration i.e., the length and cross-sectional area of the magnetic path has not been changed, it is apparent that the reluctance of the magnetic circuit must have increased. Under these conditions it follows that the permeability of the magnetic material in the path must have decreased.

It is well known that if a magnetic core with a closed path of reluctance R has a gap cut in the core, the reluctance will increase to some value R1. This is true because the air in the gap has a higher reluctance, or a lower permeability, than the iron. A similar result may be achieved by introducing a thin section of saturated magnetic material into the path. This in effect is what the subject of the present invention accomplishes.

I have found that by passing sufficient current through a wire, which has been inserted in a magnetic core at right angles to the normal flux in that core, to cause local saturation of a portion of the core in immediate proximity to the wire, that the reluctance of the core will increase slightly. By increasing the amount of wire in the core, that is, by winding it in a manner shown in the various embodiments of the invention, this effect can be greatly increased. Moreover, if this winding is surrounded by its own core of highly permeable magnetic material, the power requirements of the control winding are greatly reduced. In this respect the magnetic saturation control element readily lends itself to low power control applications. Additionally, the control winding can be wound in a manner such that it will have substantially no mutual inductance with respect to the other windings coupled to the magnetic circuit. This condition is desirable in preventing feedback from the output circuit to the control circuit.

Accordingly, it is an object of this invention to provide a novel means whereby the mutual inductance between a number of windings may be varied in a predetermined manner.

Another object of the invention is to provide means for switching magnetic flux from one path to another path.

A further object of the invention is to provide novel means for reversing the direction of the mutual induction between a group of windings.

A still further object of the invention is to provide means for selectively coupling a number of windings in a magnetic circuit to the exclusion of the remaining windings.

Still another object of the invention is to provide a novel telephone switch for magnetically connecting subscriber stations.

A still further object of the invention is to provide a novel telephone conference circuit arrangement whereby one or more parties may be interconnected by magnetic means.

Another object of the invention is to provide a novel magnetic saturation control element which utilizes a minimum of the more expensive high permeability magnetic materials.

Still another object of the invention is to provide a magnetic saturation control element which may be rendered substantially independent of any flux variation due to the controlled windings.

A further object of the invention is to provide a method of constructing a magnetic saturation control element which permits it to be readily inserted in an air gap in a magnetic core to produce a controlling function.

Other objects of the invention will become apparent upon a reading of the specification taken in conjunction with the following drawings in which.

Figure 3:
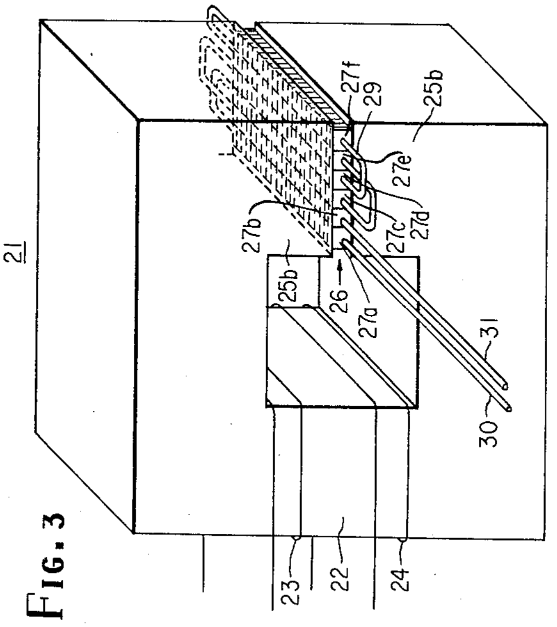
FIG. 3 shows a third embodiment of the magnetic saturation control element.
Figure 4:
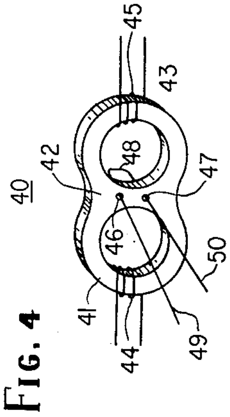
FIG. 4 depicts a fourth embodiment of the magnetic saturation control element.
Figure 1:
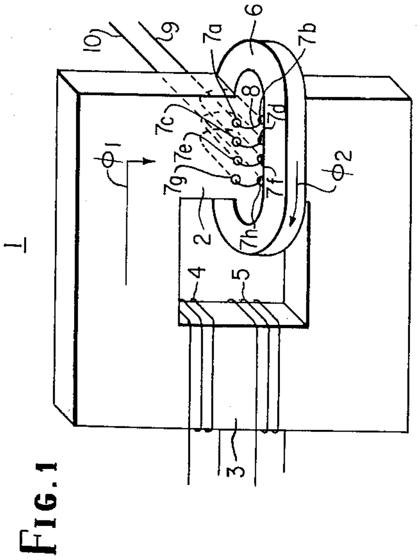
FIG. 1 depicts one embodiment of the magnetic saturation control element.
Figure 2:
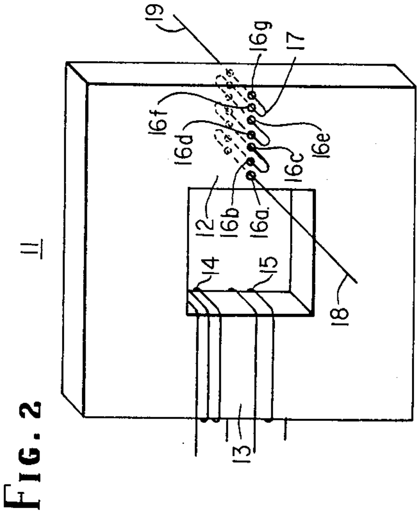
FIG. 2 shows another embodiment of the magnetic saturation control element.

The embodiments of the magnetic saturation control element shown in FIG. 1–3 of the drawings will be seen to apply to a series type of control, that is, one in which the control element is interposed in series with a magnetic circuit. On the other hand the embodiment shown in FIG. 4 is in the nature of a parallel or shunt type control element where, upon the energization of the control winding, the flux tends to move out into a path which normally has a higher reluctance than the path containing the unenergized control element.

The construction and operation of the magnetic saturation control element will now be described in detail with reference to the accompanying drawings.

Referring now to FIG. 1 of the drawings, one embodiment of the magnetic saturation control element is shown. The magnetic circuit consists of a core 1 having legs 2 and 3, on the latter of which windings 4 and 5 are wound. Control core 6, which lies in a plane perpendicular to leg 2 intersects leg 2 as shown. Leg 2 has two parallel rows of apertures *7a–7g* lying substantially along the lines of intersection of control core 6 and leg 2. Control winding 8 is threaded through these apertures *7a–7g* as follows: beginning at point 9 of the winding, it is threaded forwardly through aperture *7a*, then downwardly and rearwardly through aperture *7b*, then upwardly and forwardly through aperture *7c*, and in like manner through the remaining apertures and terminating at point 10 of the winding.

Assume that upon the energization of winding 4 a flux 1 will flow as shown. The magnitude of this flux is dependent upon the potential impressed upon, and the number of turns in, winding 4, and the reluctance of the magnetic circuit. Assume now that control winding 8 is energized to cause a flux 2 to flow as shown. This flux will cross flux 1 substantially along the lines of interesection of control core 6 and leg 2. Assuming further that the flux 2 is of sufficient magnitude to saturate the portion of leg 2 which it traverses, it can be seen that the flux will encounter at the intersection of control core 6 and leg 2 a "sheet" of saturated magnetic material. In effect then, flux 1 encounters a path of very high reluctance in this portion of leg 2. As the reluctance of the magnetic circuit has been increased, 1 must decrease. Likewise, the mutual inductance between windings 4 and 5 will be varied as the reluctance of the magnetic circuit linking these windings is varied. It can be seen that the addition of the magnetic saturation control element to a conventional magnetic core results in variations in the reluctance of the magnetic circuit which are responsive to changes in the potential impressed upon the magnetic control element winding.

While special magnetic materials are not essential to the operation of the magnetic saturation control element, it can easily be seen that high permeability materials will enhance the controlling effect. It will also be noted that the mutual inductance between control winding 8 and windings 4 and 5 is very small due to the fact that the turns of control winding 8 lie substantially parallel to the path of flux 1.

In FIG. 2 another embodiment of the magnetic saturation control element is shown having a magnetic core 11, with legs 12 and 13, with windings 14 and 15 wound on leg 13. Leg 12 has a series of apertures 16*a*–16*g* through which magnetic control winding 17 is threaded. The manner of threading the windings through these apertures is apparent from a perusal of FIG. 2.

Assume current is caused to flow in control winding 17 from point 18 to point 19. A clockwise flux will be established around the portion of winding 17 lying in aperture 16*a*. Likewise a counter-clockwise flux will be established around the portion of the winding in aperture 16*b*, a clockwise flux around the portion in aperture 16*c*, etc. A flux pattern, having alternate positive and negative maxima between adjacent apertures, will result. It should be noted that, so far as windings 14 and 15 are concerned, the effects of the oppositely directed fluxes generated by control winding 17 tend to cancel. Hence, for practical purposes, control winding 17 is non-inductive to windings 14 and 15. However, the local fluxes do exist and tend to saturate the portions of the core which they traverse, thus increasing the reluctance of the core. This change in reluctance of the core results in a variation in the mutual inductance between winding 14 and winding 15. If the current in the control winding is varied, the mutual inductance between windings on the core will be varied accordingly.

In FIG. 3 there is shown another embodiment of the magnetic saturation control element comprising a magnetic core 21 having legs 22, 25*a*, and 25*b*. The legs 25*a* and 25*b* are separated by an air gap 26. Windings 23 and 24 are wound on leg 22. In this embodiment the magnetic saturation control element has its own core which is inserted in the air gap 26 in close fitting relationship with legs 25*a* and 25*b*. This control core consists of parallel rows of stacked rectangular shaped pieces of magnetic material 27*a* to 27*f* with apertures in their centers. The control winding 29 is threaded through the control core as follows: beginning at point 30 of the winding, it passes rearwardly through the apertures of the parallel row of stacked rectangular pieces of material beginning with piece 27*a*, then to the right to the second adjacent parallel row of stacked rectangular shaped pieces of material and forwardly emerging at 27*c*, then to the right and rearwardly to 27*e*, then to the right and forwardly emerging at 27*f*, then to the left and rearwardly to 27*d*, then to the left and forwardly emerging at 27*b* and terminating at point 31.

It can be seen that control winding 29 is wound in bifilar fashion which renders it completely non-inductive to windings 23 and 24. In this embodiment it is preferable that the control core be fabricated of extremely high permeability material, such as "Supermalloy." Since only a very small portion of the core need be of this type material, it would prove economical to do so. The stacking and laminating of the magnetic material tends to reduce eddy current losses, but the device will operate satisfactorily even if the core is solid. With the use of high permeability materials a small voltage impressed across the control winding 29 will quickly saturate the control core and hence a relatively small control signal may be utilized.

In FIG. 4 is shown another embodiment of the magnetic saturation control element. This embodiment shows a magnetic core 40 with two large circular apertures and three legs 41, 42, and 43 having windings 44 and 45 wound on legs 41 and 43 respectively. There are two small apertures 46 and 47 in leg 42 through which magnetic control winding 48 is threaded. The control winding 48 is so disposed that its flux will not traverse legs 41 and 43 but remain in a local path in leg 42.

Normally winding 44 is in non-inductive relationship with winding 45 since the flux path containing legs 41 and 42 is shorter than the flux path containing legs 41 and 43. Consequently the reluctance of the former path will be less than that of the latter. Hence, any flux set up by either winding 44 or winding 45 will prefer the short path through leg 42. However, if a current sufficient to cause saturation is passed through control winding 48, the reluctance of leg 42 will be greatly increased and any flux emanating from either winding 44 or winding 45 will now prefer the longer path consisting of legs 41 and 43. It can be seen then that by saturating leg 42 windings 44 and 45 can be switched into inductive relationship with each other. Here again no special magnetic materials are required, but the use of high permeability material is desirable. Since the embodiment shown in FIG. 4 may be made extremely small, the use of these expensive high permeability materials can be economically justified.

It will be understood that the embodiments shown in FIGS. 1 to 4 inclusive are merely for purposes of illustration and are not intended to limit the scope of the invention. In addition, aperture sizes, spacings, and number of turns on the control windings are employed for clarity of illustration only and should not be construed to limit the invention in these particulars.

Figures 5, 6:
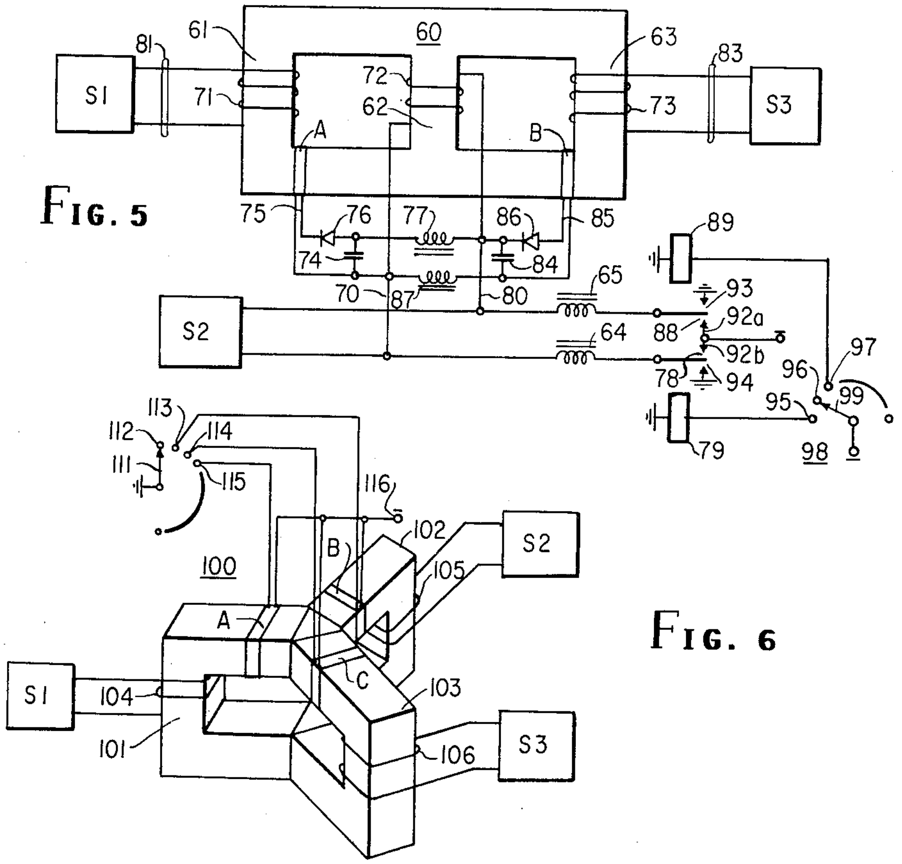
FIG. 5 is a schematic drawing of a telephone circuit utilizing magnetic saturation control elements which are selectively energized over the operator's line wires to permit private conversation between the operator and the selected party.
FIG. 6 shows a three-party conference circuit arrangement utilizing magnetic saturation control elements in which any party may be excluded from the conversation.

In FIG. 5 is shown a telephone switching device utilizing magnetic saturation control elements. The magnetic portion of the circuit comprises a core 60 having legs 61, 62, and 63 with magnetic saturation control elements A and B interposed between legs 61 and 62, and 62 and 63, respectively. For simplicity, the magnetic saturation control elements A and B are shown as rectangles with lead pairs 75 and 85 respectively, emerging therefrom. S1 and S3 may be assumed to represent subscriber substations and S2 an operator substation.

Windings 71, 72, and 73 are wound on legs 61, 62 and 63 of magnetic core 60 and are connected over leads 81, 70 and 80, and 83, to S1, S2, and S3, respectively. Leads 70 and 80 are paralleled, through choke coils 64 and 65, to movable relay contacts 78 and 88 respectively. Lead 70 also connects to capacitor 74, choke coil 87, and, over one of the leads 75, magnetic saturation control element A. The remaining one of leads 75 connects to rectifier 76, whose other terminal is connected to the aforementioned capacitor 74 and to another choke coil 77. The other end of choke 77 is connected to another capacitor 84 and over one of the leads 85 to magnetic saturation control element B. The remaining one of these leads 85 is connected to rectifier 86 whose other terminal is connected to capacitor 84, to line 80, and to the other end of choke 77. A polarity reversing device 90 is provided and comprises; relays 79 and 89 having the aforementioned contacts 78 and 88, respectively, and switch 98. One each of the leads of relays 79 and 89 is grounded. The other relay leads terminate on contacts 95 and 97, respectively, of switch 98. Contact 96 represents the unoperated position of switch 98. The wiper arm 99 of switch 98 is connected to negative battery. Relays 89 and 79 are provided with contacts 93 and 92*a* and 94 and 92*b* respectively. Contacts 93 and 94 are grounded and contacts 92*a* and 92*b* are paralleled to negative battery. Under normal conditions, that is, with the switch wiper arm 99 of switch 98 on terminal 96, all stations S1 to S3 are inductively coupled to each other.

Assume that the operator at S2 wishes to speak privately with the party at subscriber station S3. The operator at S2 closes switch wiper arm 99 to contact position 97 thereby energizing relay 89, causing movable relay contact 88 to close to ground at contacts 93, and movable relay contacts 78 to close to negative battery at contacts 92*b*, completing a direct current circuit as follows: from negative battery to contact 92*b*, contact 78, choke coil 64, through magnetic saturation control element A via lead 70 and leads 75, through rectifier 76, through choke 77 to line 80, choke coil 65, relay contact 88, and ground via contact 93. This direct current causes magnetic control element A to saturate thereby increasing the reluctance of the flux path containing core legs 61 and 62 and effectively isolating subscriber station S1 from stations S2 and S3. Conversation between the operator at station S2 and the party at station S3 may now proceed in privacy.

By moving switch wiper arm 99 to contact 95, magnetic saturation control element B may be energized, thereby effectively uncoupling subscriber station S3 from stations S1 and S2 and a conversation between the party at station S1 and the operator at station S2 may be held in privacy. The capacitors 74 and 84 and the choke coils 77 and 87 are used to prevent audio signals from being introduced into magnetic saturation control elements A and B, and chokes 64 and 65 isolate audio signals appearing at winding 72 and station S2 from the exchange battery. In FIG. 6 there is shown another device utilizing magnetic saturation control elements, comprising a magnetic core 100 having U-shaped core sections 101, 102, and 103 which are connected together at their open ends in Y configuration. Windings 104, 105, and 106 are wound around core sections 101, 102, and 103 and are connected to S1, S2, and S3 respectively. Assume again, for purposes of explanation, that S1 to S3 are subscriber telephone stations. Magnetic saturation control elements A, B, and C are interposed in core sections 101, 102, and 103, respectively.

A selector switch 110 is provided and has a wiper arm 111, one end of which is connected to ground; the other end has access to contacts 112, 113, 114, and 115. Magnetic saturation control elements A, B, and C each have a pair of leads, one each of said pairs being connected to negative battery at 116 and the other of each of said pairs being connected to switch contacts 115, 113, and 114 respectively. Switch contact 112 represents the unoperated position of selector switch 110.

With wiper arm 111 of selector switch 110 in its unoperated position on contact 112, conversations between subscriber stations S1, S2, and S3 may be had. Either station S1, S2, or S3 may be isolated from the conversation path by energizing the magnetic saturation control element interposed in the core section associated therewith. Assume that the party at subscriber station S1 wishes to speak privately with the party at subscriber station S3. Switch 110 is operated to place switch wiper arm 111 on contact 113, completing a circuit from ground through magnetic saturation control element B to negative battery at 116. Over this path magnetic saturation control element B saturates and effectively uncouples subscriber station S2 from the magnetic circuit. In a similar manner, either S1 or S3 may be eliminated from the conversation.

Figure 7:
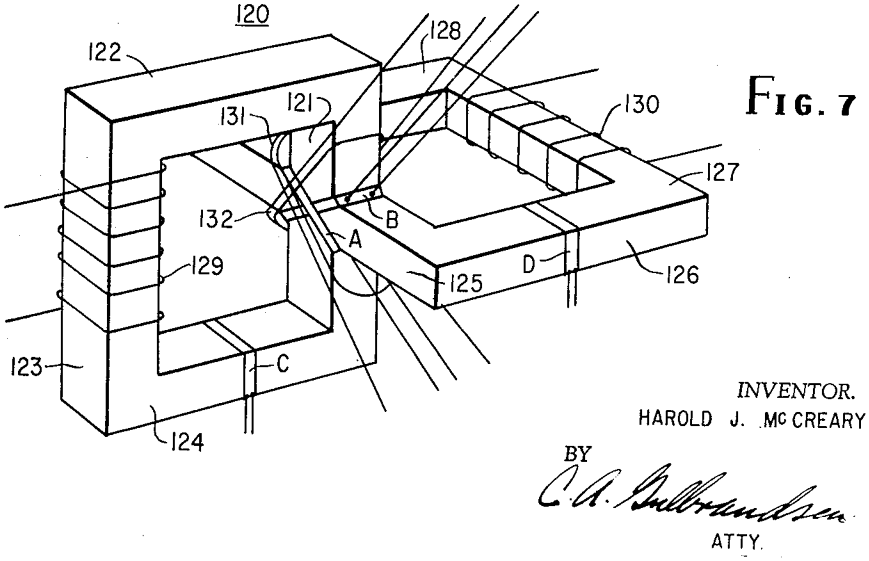
FIG. 7 shows a cross-valve core structure (see U.S. Patent No. 2,445,857, which issued to me on July 27, 1948) with magnetic saturation control elements interposed in various portions of the core to produce novel switching effects.

In FIG. 7 there is shown a magnetic switching device having a core 120 comprised of two core sections. One core section consists of legs 121, 122, 123, and 124, and the other section of legs 125, 126, 127, and 128, with the leg 121 and the leg 125 intersecting in such manner that the plane of the core section comprising legs 121—124 is at right angles to the plane of the core section comprising legs of 125 to 128. Magnetic saturation control element A is interposed along a line joining one pair of diagonally opposed corners of the intersection of legs 121 and 125, and magnetic saturation control element B is interposed along the line joining the remaining pair of diagonally opposed corners of this intersection. Magnetic saturation control elements C and D are interposed in legs 124 and 126 respectively. Windings 129 and 130 are wound around legs 123 and 127 respectively. Winding 131 is wound around the pair of diagonally opposed corners of the intersection containing magnetic saturation control element A and winding 132 is wound around the corners of the intersection containing magnetic saturation control element B.

Normally, windings 129 and 130 are in non-inductive relationship with each other. However, upon the energization of either magnetic saturation control element A or B, the previously non-inductive windings become inductively coupled. For example, assume that magnetic saturation control element A is energized. Now, if winding 129 is energized to cause flux to flow upwardly in leg 123, the flux path will be as follows: leg 123, leg 122, the upper half of leg 121, the right half of leg 125, leg 126, leg 127, leg 128, the left half of leg 125, the lower half of leg 121, and leg 124. It will be noted that winding 129 and winding 130 have become mutually inductive to each other. It will also be seen that if magnetic saturation control element B were energized instead of A, then the flux generated by winding 129, which threads winding 130, would do so in the opposite direction from that when saturation control element A is energized, thereby not only coupling windings 129 and 130 but also causing a reversal of the mutual inductance between these windings.

It will also be observed that when magnetic saturation control element A and winding 129 are both energized as previously described the flux established by winding 129 will thread winding 132 twice in its journey around the magnetic circuit. If magnetic saturation control element B were energized instead of A, this flux would thread winding 131 twice.

Windings 131 and 132 are normally inductively coupled to windings 129 and 130. Upon the energization of magnetic saturation control element C, windings 131 and 132 are rendered substantially non-inductive to winding 129, and similarly, upon the energization of saturation control element D, these windings are rendered substantially non-inductive to winding 130. In addition, windings 131 and 132, upon the energization of either saturation control element C or D, become mutually inductive to each other.

It is, of course, obvious that if both magnetic saturation control elements A and B or both saturation control elements C and D are operated simultaneously, all of the windings will be substantially non-inductive with respect to all of the other windings.

Figure 8:
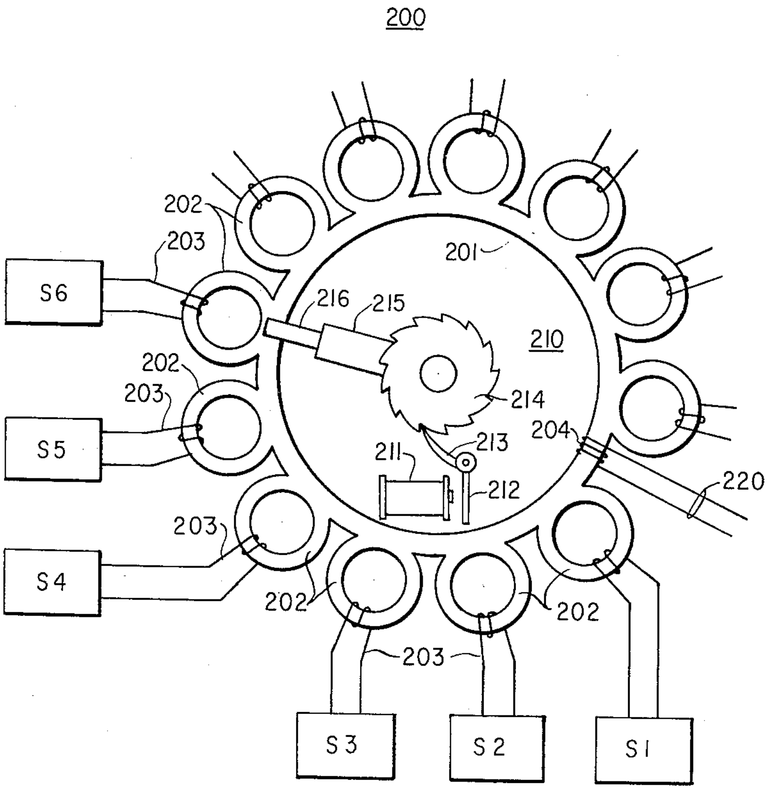
FIG. 8 is a drawing of a magnetic telephone switch for connecting the desired party to a calling line.

In FIG. 8 the use of the magnetic saturation control element in a novel telephone connector switch is shown. The embodiment shown in FIG. 4, being adapted for parallel or shunt type control, is most suitable in this application. The structure consists of a magnetic core 200 which is comprised of a relatively large ring type core section 201, to the periphery of which are attached numerous smaller ring type core sections 202. Associated with each of these smaller ring type core sections 202 are windings 203 which are connected to individual subscriber stations, only a few of which are shown.

A stepping switch mechanism 210 of conventional design is comprised of motor magnet 211 and armature 212 which is connected to pawl 213, which engages ratchet 214 carrying arm 215, to which magnet 216 is attached. The means for energizing the motor magnet 211 are not shown.

It will be noted that there are no control windings associated with this embodiment, the saturating effect being produced by the magnet 216. The magnet 216 may be of either the permanent or electric type. Preferably it is U-shaped and adapted to "straddle" the core section 201. A calling line is connected over leads 220 to winding 204 which is coupled to magnetic core section 201. Normally, with the magnet 216 resting at its home position opposite subscriber station S1, the path of any flux in the circuit will be through the small core section 202 associated with subscriber station S1 and the large core section 201.

In this device, subscriber station S1 is normally magnetically coupled to core section 201 and therefore inductively coupled to winding 204. Assuming that it is desired to couple subscriber station S6 to winding 204, the stepping switch 210 is operated to step the magnet 216 around until it rests substantially over the line of intersection of the core section 202 associated with subscriber station S6 and the core section 201, substantially as shown in the drawing. In this position, subscriber station S6, via its winding 203, is magnetically coupled to winding 204 while the other subscriber stations remain effectively disconnected from the magnetic circuit. This is so because magnetic flux tends to take the path of least reluctance, which, in this case, is normally through core section 201. But, upon encountering a saturated portion of core section 201 such as that which now exists at the intersection of the core section 202 associated with subscriber station S6 and core section 201, the flux flows along the path of lower reluctance around the saturated portion, which is through said core section 202 associated with subscriber station S6. Hence, subscriber station S6 is inductively coupled to winding 204. In like manner any other subscriber station may be coupled to winding 204 to the exclusion of all the remaining stations by selective operation of stepping switch 210.

Figure 9:
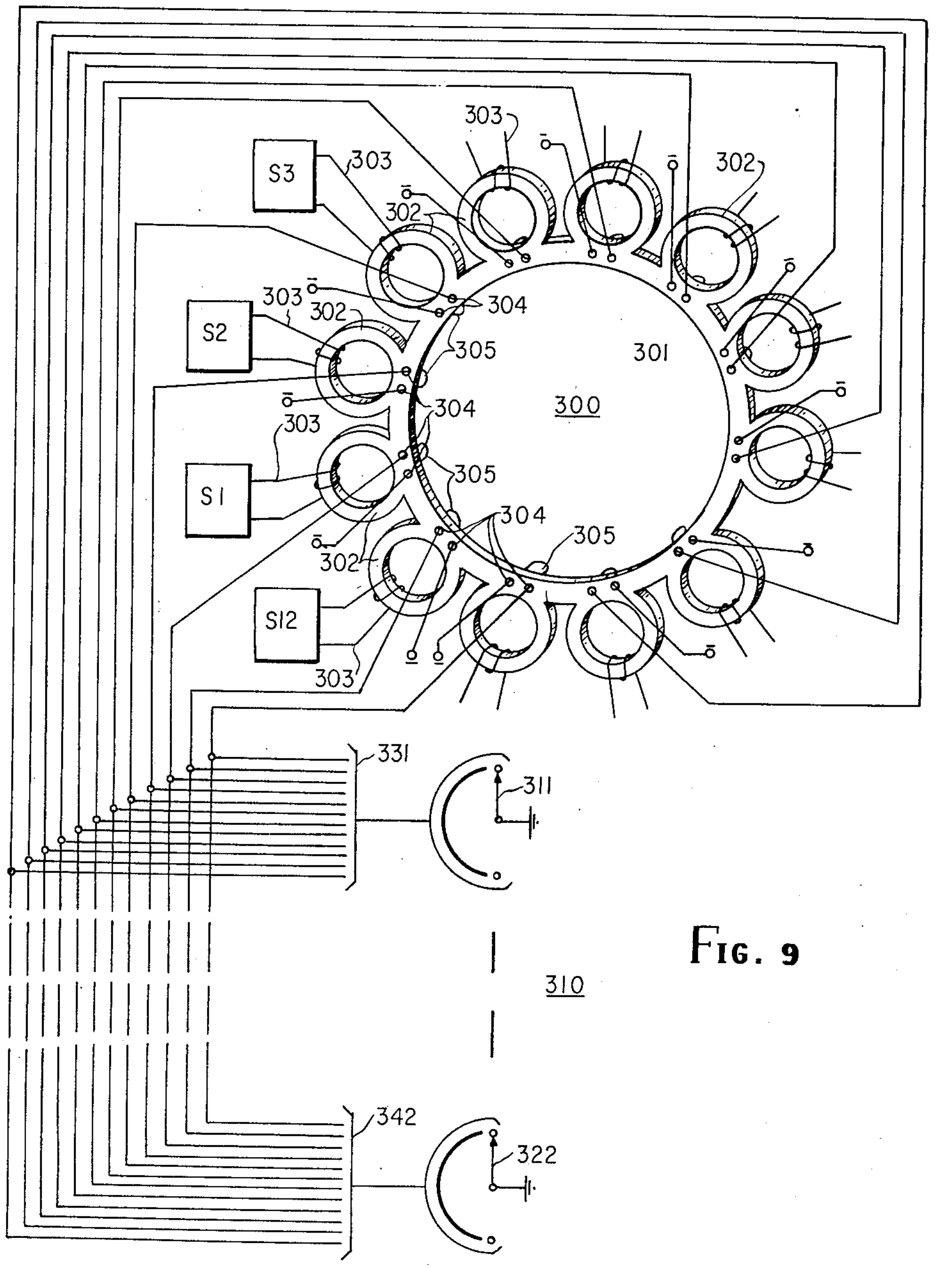
FIG. 9 shows another conference circuit arrangement utilizing magnetic saturation control elements whereby the parties may be selectively switched in or out of the conference circuit by magnetic means.

In FIG. 9 is shown a telephone conference circuit arrangement utilizing magnetic saturation control elements. A magnetic core 300 similar to that shown in FIG. 8 is comprised of large core section 301 and a plurality of smaller core sections 302. Associated with each of these smaller core sections 302 are windings 303 which terminate in subscriber stations. Again, for the purposes of clarity, only a few of the subscriber stations are shown. Additionally, a series of pairs of apertures 304, through which individual magnetic control windings 305 are threaded, are provided. These apertures lie substantially along the lines of intersection of the core sections 302 with the core section 301.

A selector switch 310 is provided which includes wiper arms 311—322 inclusive, which are associated with contact groups 331—342 inclusive. One lead of each of the magnetic control windings 305 is connected to negative battery and the other lead of each is connected to one of the contacts 331 of the switch 310. The leads terminating on contacts 331 of switch 310 are then multiplied or paralleled to each of the contact groups 332—342 respectively. In the drawing only two of these contact groups, namely 331 and 342, are shown.

Assuming that a flux is introduced in core section 301 and further assuming that none of the magnetic control windings 305 are energized, it will readily be apparent that the flux will remain in core section 301 and will not traverse any of the small core sections 302. Upon the energization of one or more of the control windings 305, a portion or portions of core section 301 will become saturated, thereby increasing the reluctance of these portions and causing the flux to seek a path around them, which path will be through the small core sections 302 associated with the energized control windings 305. Hence, it can be readily seen that the subscriber stations coupled by windings 303 to the core sections 302 associated with the energized control windings 305 will be magnetically coupled to the flux assumed to be flowing in the circuit. By selective operation of the selector switch 310, it is therefore apparent that any number of the subscriber stations may be magnetically coupled to each other through core section 301 to permit a conference circuit arrangement. The assumed flux may be established by the windings 305 due to their energization by equipment, not shown, included in the subscriber stations. Another method would be to introduce flux into the circuit via another winding linking core section 301, and modulate this flux by audio signals in windings 305.

It is to be understood that numerous modifications in the details of construction and the combination and arrangements of parts may be resorted to without departing from the true spirit and scope of the invention as defined in the following claims.

What is claimed is:

1. A magnetic switching device comprising a magnetic core, a plurality of windings wound on said core, and magnetic saturating means interposed in the path of the magnetic flux in said core for local magnetic saturation of a region containing a small portion of said magnetic path, thereby controlling the mutual inductance between said plurality of windings; said magnetic saturating means including control winding means imbedded in a slab of magnetic material, said slab being inserted in an air gap in said core, generally cross-wise thereof, and being of small width compared to the length of said magnetic path, the magnetic material of said slab being of higher permeability than the material of said core whereby only said magnetic material becomes saturated upon energization of said winding means.

2. A magnetic switching device as claimed in claim 1, wherein said saturating control winding means is wound so as to have substantially no mutual inductance with the plurality of windings on said core.

3. A magnetic switching device as claimed in claim 2, wherein said saturating control winding means is wound in a bifilar manner.

4. A magnetic switching device as claimed in claim 1 and further comprising a plurality of generally U-shaped core sections connected together at their ends in a magnetic mutually shunting relation, one of said windings being wound on and one of said saturating means being interposed in each of said core sections, whereby the energization of any one saturating means effectively decouples the winding on the corresponding core section from the remaining windings.

5. A magnetic switching device as claimed in claim 4, wherein the control windings of said plurality of saturating means are selectively energized so that predetermined windings from said plurality of windings are mutually coupled together and decoupled from the remaining windings.

6. A magnetic switching device as claimed in claim 5, wherein each of said plurality of windings is connected to a telephone line.

7. A magnetic switching device as claimed in claim 5, wherein an additional core section with only a winding thereon is provided in a magnetic shunting relation to two of said generally U-shaped core sections, whereby energization of the saturating means interposed in either U-shaped section decouples the winding on the last mentioned section from the winding on said shunting core section.

8. A magnetic switching device as claimed in claim 7, wherein said winding on said additional core section is included in an alternating current signal circuit, wherein said two saturating means are included in direct current control circuits, and wherein there is provided a pair of conductors included in both said alternating current signal circuit and said direct current control circuits, and filter means for preventing direct current flow in said winding and preventing alternating current flow in said saturating means, and also means for closing said direct current control circuit in one or the other direction of current flow whereby said saturating means may be selectively energized.

9. A magnetic switching device as claimed in claim 1, comprising two distinct core sections joined in an intersection formed by one member of each said core section, said core sections comprising distinct magnetic paths, a first and a second winding each magnetically linked to a respective one of said paths, said magnetic saturation means interposed, in said intersection along a line joining diagonally opposed corners of said intersection, and energizing means for energizing said saturation means thereby switching said windings into a state of mutual induction with each other.

10. A magnetic switching device as claimed in claim 9, wherein said magnetic saturating means comprises two saturating elements interposed in said intersection along the line joining two pairs of diagonally opposed corners, respectively, of said intersection, a third and a fourth winding wound around said pairs of diagonally opposed corners, whereby the mutual inductance of said windings may be varied in accordance with the energization of said saturating elements.

11. A magnetic switching device as set forth in claim 10 and further including a third and a fourth saturation element each interposed in one of said magnetic paths and effective depending on their selective energization to change the direction of the mutual induction between said third and said fourth windings.

References Cited in the file of this patent

UNITED STATES PATENTS

| | | |
|---|---|---|
| 2,519,426 | Grant | Aug. 27, 1950 |
| 2,685,653 | Orr et al. | Aug. 3, 1954 |
| 2,740,110 | Trimble | Mar. 27, 1956 |
| 2,741,757 | Devol et al. | Apr. 10, 1956 |
| 2,818,555 | Lo | Dec. 31, 1957 |
| 2,842,755 | Lamy | July 8, 1958 |
| 2,863,136 | Abbott et al. | Dec. 2, 1958 |

FOREIGN PATENTS

| | | |
|---|---|---|
| 755,656 | Germany | Feb. 23, 1953 |
| 1,015,855 | Germany | Sept. 19, 1957 |